US007424630B2

United States Patent
Horvath

(10) Patent No.: US 7,424,630 B2
(45) Date of Patent: Sep. 9, 2008

(54) MULTIPROCESSOR SYSTEM WITH SELECTIVE PROCESSOR POWER DOWN OF CORE AND INTER-PROCESSOR COMMUNICATIONS PORTS

(75) Inventor: Stephen Ejner Horvath, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 19 days.

(21) Appl. No.: 11/590,316

(22) Filed: Oct. 31, 2006

(65) Prior Publication Data
US 2008/0104429 A1    May 1, 2008

(51) Int. Cl.
*G06F 1/00* (2006.01)

(52) U.S. Cl. ...................................................... 713/300

(58) Field of Classification Search .................. 713/300
See application file for complete search history.

(56) References Cited

U.S. PATENT DOCUMENTS

| | | | |
|---|---|---|---|
| 6,154,845 A * | 11/2000 | Ilkbahar et al. | 713/300 |
| 6,308,285 B1 | 10/2001 | Bowers | |
| 6,449,729 B1 * | 9/2002 | Sanders et al. | 714/4 |
| 6,529,032 B1 * | 3/2003 | Cruickshank et al. | 326/14 |
| 6,757,761 B1 * | 6/2004 | Smith et al. | 710/100 |
| 6,792,550 B2 * | 9/2004 | Osecky et al. | 713/300 |
| 6,901,522 B2 | 5/2005 | Buch | |
| 7,032,119 B2 | 4/2006 | Fung | |

* cited by examiner

*Primary Examiner*—Rehana Perveen
*Assistant Examiner*—Eric Chang

(57) ABSTRACT

The present invention provides a multiprocessor system and method in which power can be withheld from a core and inter-processor communications ports of a first processor while power continues to be supplied to a second processor.

11 Claims, 3 Drawing Sheets

MULTIPROCESSOR SYSTEM WITH SELECTIVE PROCESSOR POWER DOWN OF CORE AND INTER-PROCESSOR COMMUNICATIONS PORTS

BACKGROUND OF THE INVENTION

Herein, related art may be discussed to put the invention in context. Related art labeled "prior art" is admitted prior art; related art not labeled "prior art" is not admitted prior art. Also, herein, "multiprocessor" refers to a computer with two or more central processing units.

Computer processors, the "brains" of computers, can consume a lot of power and, in the process, dissipate a lot of heat. The power consumption by the processor plus the provision for removing the potentially damaging heat can be expensive. Accordingly, modern processors often provide for low-power states that reduce power consumption and heat generation at the expense of lower, even zero, performance. In multiprocessor systems, workloads can be distributed so that some processors enter sleep states, while others continue processing. In some multiprocessor systems, some power continues to be supplied to a "suspended" processor so that, even when off, it provides proper impedance matching to a multiprocessor bus, over which the processors communicate with each other and other system devices. As explained in the detailed description below with reference to the following figures, the present invention provides for further reductions in power consumption and heat generation in some circumstances.

BRIEF DESCRIPTION OF THE DRAWINGS

The following figures are depictions of specific embodiments of the invention and not of the invention itself.

DETAILED DESCRIPTION

The present invention provides for reduced power consumption and heat generation in a point-to-point multiprocessor system by allowing power to be removed completely from individual processors. In a point-to-point multiprocessor system, each pair of processors has its own communications bus. If one of the processors on a given bus is powered down, the bus is unused so that an impedance mismatch on that bus is not a problem. Other pairs of active processors can still communicate via other buses. Since an impedance mismatch is not a problem, power can be removed both from the processor core or cores and from the processor's input/output ports. Furthermore, those ports on the other processors in the system coupled to the powered-down processor can have power removed for further savings in power consumption and heat generation.

A multiprocessor computer system AP1 comprises four processor nodes N1-N4, a system communication buses 11, and input/output devices 13. Nodes N1-N4 include respective processors P1-P4 and main memories MM1-MM4. Processors P1-P4 communicate with each other pair-wise rather than through a common processor bus. This provides for faster communications between processors and faster access to main memory where the processor and main memory are from the same node.

Figure 2:
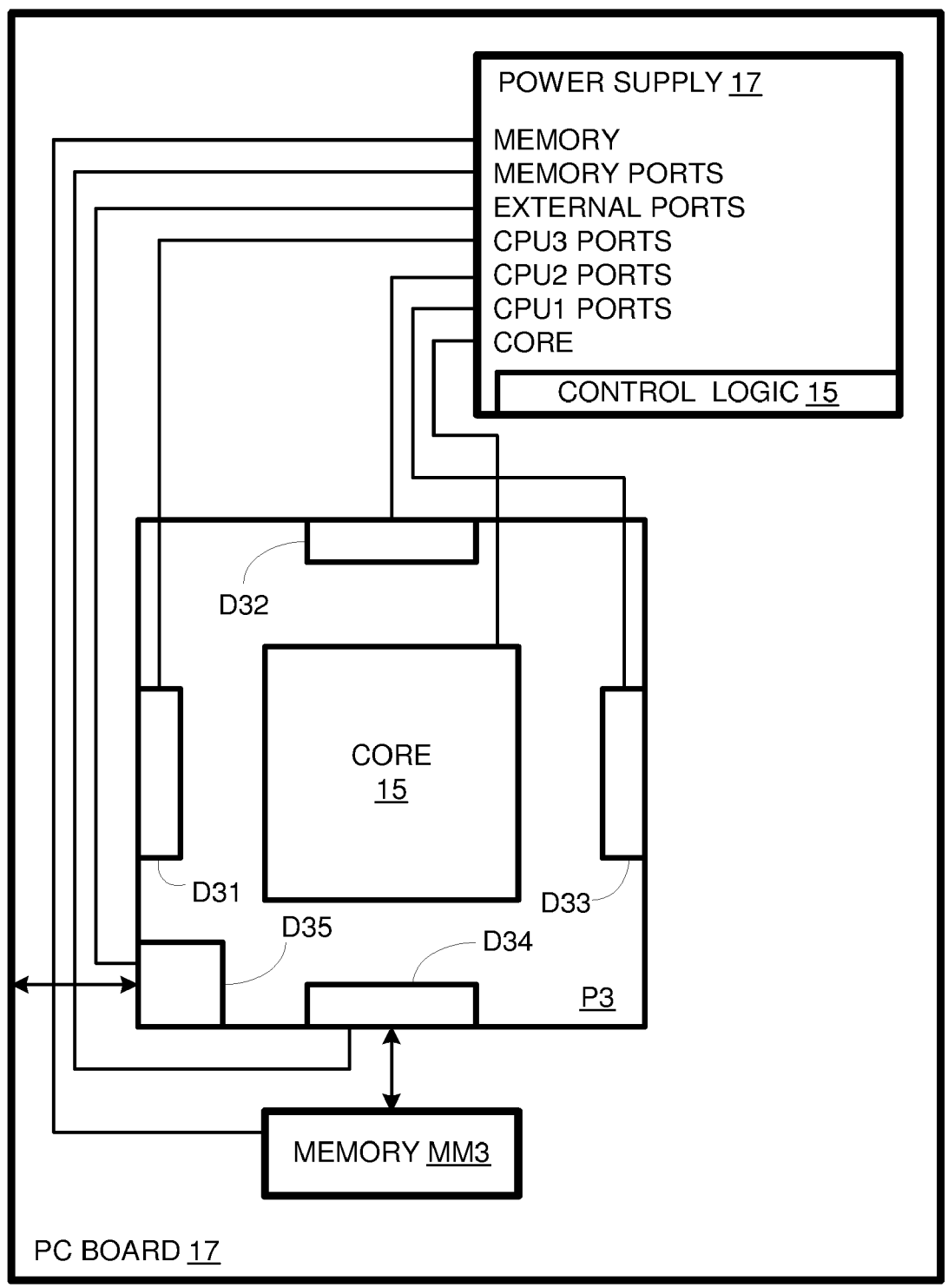
FIG. 2 is a flow chart of a method in accordance with an embodiment of the invention.

The present invention leverages the direct connections to permit CPUs to be fully powered down. Instead of merely powering down a core 15, e.g., execution units and instruction decoders, the present invention provides for also powering down drivers D11-D14 and D21-D24, normally used for off-processor communications, e.g., with other processors and devices via conductors on a PC board 17, as shown in FIG. 2. Thus, when processor P3 is powered down, not only is core 15 powered down, but also communications ports D31-D35. In an alternative embodiment, a communications port to a system communication bus is left on for impedance matching purposes. To provide for the long distances and uncertain PC board characteristics, the communication drivers tend to require relatively high power. Thus, the savings in powering these down can be a substantial addition to that achieved by deactivating the core.

Of course, once a processor is powered down, the memory it controls can be powered down since other processors cannot access it. This means that any data previously required by this or other processors needs to be moved out of the memory to another memory device not targeted for being powered down. Thus, processor P3 and memory MM3 are shutdown in FIG. 1, as indicated by their representation in dash instead of solid lines; communication ports D12 of processor P1, D21 of processor P2, and driver port 43 of processor P4 can be shut down as well.

The invention further provides for powering down any circuit elements on active processors dedicated to communicating with an inactive processor. Thus, when processor P3 is powered down, communication ports D12 of processor P1, D21 of processor P2, and driver port 43 of processor P4 can be powered down as well.

Thus, in FIG. 2, when processor P3 is to be powered down, control logic 17 for a power supply 19 withholds power from core 15, CPU communications ports D31-D33, memory communications port D34, external communications port D35, and memory MM3. Also, when processor P3 is powered down, control logic 15 can also control processor communications ports D12, D21, and D43, shown in FIG. 1.

Figure 3:
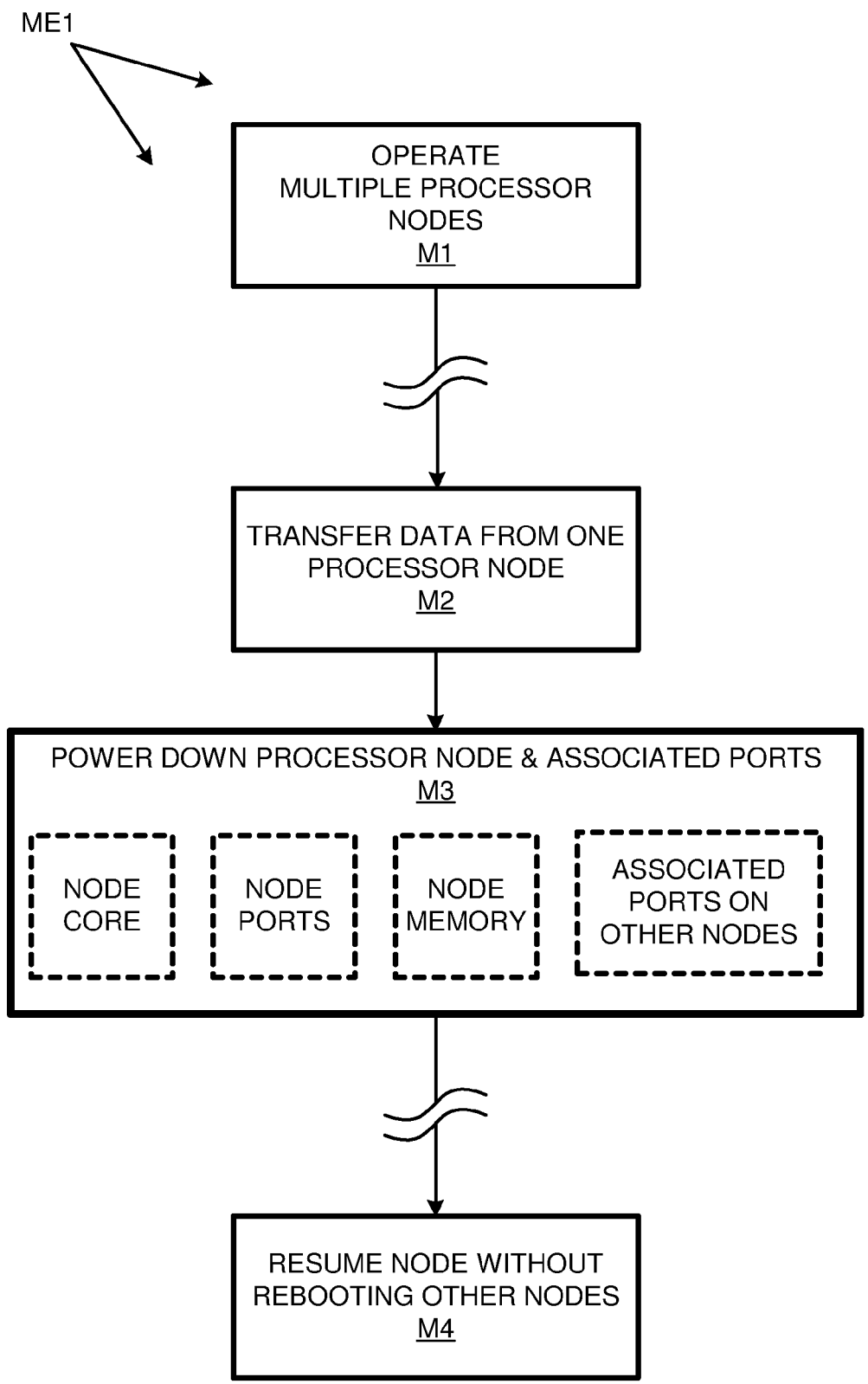
FIG. 3 is a flow chart of a method in accordance with an embodiment of the invention.

The present invention provides for a method ME1 flow charted in FIG. 3. At method segment Ml, multiple processor nodes, e.g., N1-N4, are operated. The invention provides for at least three methods for determining when individual CPU's power should be electrically removed or restored. First, a user can schedule power downs and restorations based on some heuristic. Second, workload demand can be monitored and processors can be activated and deactivated to use only the lowest number of processors that can meet demand. Thirdly, a hybrid approach can employ a combination of the first and second approaches. For example, force a low power mode during off-hours regardless of workload and turn off CPUs during peak hours if the server is not fully utilized.

The present invention provides for preparation for a processor powered down. First, all user threads must be completed, transferred or terminated on the target processor, at method segment M2. Active threads must be moved to another CPU. No new threads can be started. Second, the system must determine that enough memory will be available to the system once the target processor and its shared memory are removed. Third, all memory directly attached to the CPU must be de-allocated and data must be relocated to other CPU nodes. Fourth, processor states must be preserved, such as in another active memory bank. Fifth, direct links to other processor must be powered down. Following these preparatory actions, the power can be removed from a processor or processor node.

Thus, after some period of full operation, data is transferred from a processor node in anticipation of a power down. For example, data needed by processors P1, P2, and P4 when processor P3 is powered down is transferred form memory MM3 to one or more of memories MM1, MM2, and MM3 at method segment M2.

Then, a processor can be powered down at method segment M3. For example, processor P3, including its core and communications ports can be powered down. In addition, associated ports on other nodes can be powered down, including ports D12, D21, and D43. Whenever processor P3 is needed again, it can be activated at method segment M4. In view of the preparation at method segment M2, the other nodes (e.g., N1, N2, and N4) do not have to be rebooted.

Power consumption of multi-processor servers, used as a centralized resource for multiple users, have increased. Typically such servers have a peak usage profile for the server during normal business hours, while off-hours and holidays these servers quite often sit idle with very limited workload. Typically, in a multi-processor server there are one or more processors in an idle state that continues to consume power. This idle power, particularly with newer generation processor can be a significant fraction of the total peak power capability of the CPU. This can relate to high dollar costs to the customer, for essentially non-utilized CPU cycles.

This invention reduces server power during non-peak workload hours by electrically removing the power to individual CPUs when it is not needed. Before power can be removed from the CPU several preparatory steps must be followed to get a clean removal. There would always be at least one CPU fully powered and available, such that the server is never down. In a typical week, eight-hour workday weekday, e sixteen hours of non-peaks load, plus weekends. Non-peak workload hours account for 76% of all hours during a week. As an example, assume a hypothetical situation, with a four-way server. Typically, the idle CPUs might consume 50% of peak CPU power. With this invention, all but one CPU are consuming no power and only one of the four CPU are running during non-peak hours. In this example, the theoretical total power saving with this invention could be as high as 46%.

Full power down of individual CPUs that communicate over a common processor bus has not been done. Only one CPU can "talk" at a time on this architecture. Each CPU provides a specific load or termination to the bus. If one CPU were to lose power, its load on the bus would cause an improper impedance mismatch on the bus and potentially cause the bus and the entire server to crash. Some processors have point-to-point connections between processors for improved performance and reduced latency between processors.

The present invention provides an additional benefit for this architecture in that individual processors can be removed from their bus and break only their dedicated link, thus keeping the remaining CPUs up and available to communicate with each other and the IO sub-system.

In general, the present invention provides for systems with two, three, or more processors in which the processor communicate point-to-point rather than through a common bus. Note a two processor system could still use this invention. In this special case only one processor is powered but still communicates with the IO device. Also IO drivers at the IO device could be power down, analogous to the other CPUs IO drviers being powered down Processors can be grouped so that all processors within a group can communicate directly with each other, but not necessarily with processors in other groups. The processors can have one or more cores each. Some or all communications ports of a processor can be shutdown in the event the processor is shutdown. In addition, ports directly coupled to a processor or node can be shutdown. These and other variations upon and modifications to the illustrated embodiment are provided for by the present invention, the scope of which is defined by the following claims.

What is claimed is:

1. A method comprising:
 operating a point-to-point multiprocessor system with plural processors including at least a first processor coupled to a second processor over a first interprocessor bus not coupled to a third processor and coupled to said third processor over a second interprocessor bus not coupled to said second processor;
 while power continues to be supplied to said second processor, powering down said first processor by withholding power from a first core of said first processor, a first port of said first processor coupled to said first bus, and a second port of said first processor coupled to said second bus.

2. A method as recited in claim 1 wherein said power down also involves powering down a third port on said second processor while maintaining power to a second core of said second processor, said third port being dedicated to communicating with said first processor over said first bus.

3. A method as recited in claim 2 wherein said power down also involves powering down a fourth port of said third processor dedicated to communicating with said first processor over said second bus, while maintaining power to said second core, a third core of said third processor, and a fifth port of said third processor dedicated to communicating over a third interprocessor bus not coupled to said first processor.

4. A method as recited in claim 1 wherein said power down also involves powering down a memory external to and dedicated to said first processor.

5. A method as recited in claim 4 further comprising transferring data from said first memory to a second memory external and dedicated to said second processor so that said data can be accessed by said other processors when power is withheld from said first processor.

6. A method as recited in claim 1 further comprising restarting said first processor after power is withheld from it without restarting said second processor.

7. A point-to-point multiprocessor system comprising:
 a power supply;
 processors, including at least first second, and third processors; having respective first, second, and third cores, said first processor having first and second ports, said second processor having third and fourth ports, said third processor having fifth and sixth ports;
 interprocessor buses including first and second buses, said first bus coupling said first and second processors via said first and third ports, said second bus coupling said first and third processors via said second and fifth ports, said first bus not being coupled to said third processor, said second bus not being coupled to said second processor, and
 control logic for controlling a coupling between said power supply and said first processor so as to concurrently withhold power from said first core and said first port while maintaining a coupling between said power supply and said second processor so as to provide power to said second core.

8. A system as recited in claim 7 wherein said control logic, while withholding power from said first processor and coupling said power to said second processor so as to provide power to said second core, withholds power to said third port.

9. A system as recited in claim 8 wherein said control logic, while withholding power from said first processor, couples said third processor to said power supply so as to provide power to said third core and said sixth port while withholding power from said port.

10. A system as recited in claim 7 further comprising memories including a first memory external to and directly coupled to said first processor so that said second and third processors access said first memory through said first processor when power is supplied thereto, said control logic controlling a coupling between said power supply and said first memory so that power is withheld from said first memory while it is withheld from said first processor.

11. A processor comprising:
at least one processor core;
a first port for coupling to a first interprocessor bus connected to a second processor;
a second port for coupling to a second interprocessor bus connected to a third processor and not to said second processor; and
control logic for withholding power from said first port while providing power to said core and said second port.

* * * * *

UNITED STATES PATENT AND TRADEMARK OFFICE
CERTIFICATE OF CORRECTION

Figure 1:
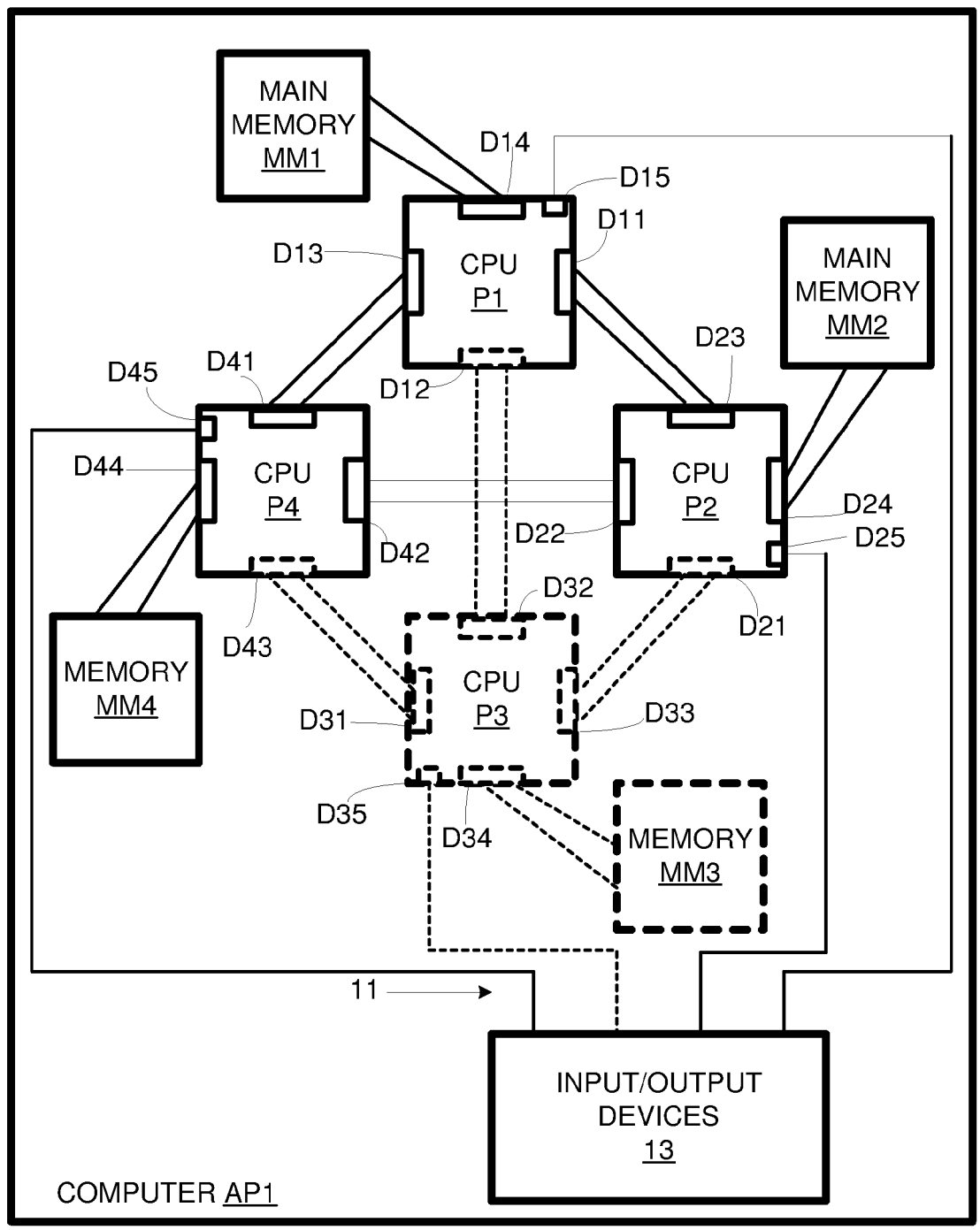
FIG. 1 is a schematic diagram of a point-to-point multiprocessor system in accordance with an embodiment of the invention.

PATENT NO. : 7,424,630 B2  Page 1 of 1
APPLICATION NO. : 11/590316
DATED : September 9, 2008
INVENTOR(S) : Stephen Ejner Horvath It is certified that error appears in the above-identified patent and that said Letters Patent is hereby corrected as shown below:

In column 1, lines 37-38, delete "FIG. 2 is a flow chart of a method in accordance with an embodiment of the invention." and insert -- FIGURE 2 is a schematic diagram of a PC board of the system of FIG. 1. --, therefor.

In column 2, line 22, delete "shutdown" and insert -- powered down --, therefor.

In column 2, line 25, delete "shut" and insert -- powered --, therefor.

In column 2, line 39, delete "15" and insert -- 17 --, therefor.

In column 4, line 2, delete "shutdown" and insert -- powered down --, therefor.

In column 4, line 3, delete "shutdown" and insert -- powered down --, therefor.

In column 4, line 4, delete "shutdown" and insert -- powered down --, therefor.

In column 4, line 48, in Claim 7, after "first" insert -- , --.

In column 4, lines 48-49, in Claim 7, after "processors" delete ";".

In column 5, line 7, in Claim 9, after "said" insert -- fifth --.

Signed and Sealed this

Thirtieth Day of December, 2008

JON W. DUDAS
*Director of the United States Patent and Trademark Office*